United States Patent
Oliverio

(10) Patent No.: US 10,931,073 B1
(45) Date of Patent: Feb. 23, 2021

(54) RETRACTABLE CHARGING ADAPTER ASSEMBLY

(71) Applicant: Mikayla Oliverio, Bridgeport, WV (US)

(72) Inventor: Mikayla Oliverio, Bridgeport, WV (US)

( * ) Notice: Subject to any disclaimer, the term of this patent is extended or adjusted under 35 U.S.C. 154(b) by 0 days.

(21) Appl. No.: 16/592,046

(22) Filed: Oct. 3, 2019

(51) Int. Cl.
| | |
|---|---|
| *H05K 5/00* | (2006.01) |
| *H01R 31/06* | (2006.01) |
| *H01R 25/00* | (2006.01) |
| *H01R 24/66* | (2011.01) |
| *H02J 7/00* | (2006.01) |
| *B60R 11/00* | (2006.01) |

(52) U.S. Cl.
CPC ............ *H01R 31/065* (2013.01); *H01R 24/66* (2013.01); *H01R 25/003* (2013.01); *H02J 7/0044* (2013.01); *B60R 2011/0054* (2013.01); *H02J 7/00* (2013.01); *H02J 2207/40* (2020.01)

(58) Field of Classification Search
USPC ....... 361/732; 174/50, 53, 59; 439/501, 164, 439/76.1
See application file for complete search history.

(56) References Cited

U.S. PATENT DOCUMENTS

| | | | | |
|---|---|---|---|---|
| 5,773,757 | A * | 6/1998 | Kenney | H01R 13/60 174/53 |
| 6,416,355 | B1 * | 7/2002 | Liao | H01R 13/6658 439/164 |
| 6,612,875 | B1 * | 9/2003 | Liao | H01R 13/2421 439/638 |
| 6,866,218 | B2 * | 3/2005 | Liao | B65H 75/4431 242/378.1 |
| 7,183,743 | B2 | 2/2007 | Geiger | |
| 10,230,200 | B1 * | 3/2019 | Tomasko | H01R 13/72 |
| 2011/0187323 | A1 * | 8/2011 | Gourley | H02J 5/00 320/111 |
| 2011/0272959 | A1 * | 11/2011 | Lupton, III | H01R 13/60 296/37.8 |
| 2013/0244475 | A1 | 9/2013 | Sayadi | |
| 2013/0320913 | A1 | 12/2013 | Chen | |
| 2014/0057463 | A1 * | 2/2014 | Bhimavarapu | A61G 7/00 439/39 |
| 2015/0349555 | A1 | 12/2015 | Ortiz Baeza | |
| 2016/0336777 | A1 | 11/2016 | Bamidge | |
| 2017/0256965 | A1 | 9/2017 | Clark | |

* cited by examiner

Primary Examiner — Hung S. Bui

(57) ABSTRACT

A retractable charging adapter assembly includes a retraction unit that is actuatable in a first direction or a second direction. A charge cord is coupled to the retraction unit and the charge cord is drawn into the retraction unit when the retraction unit is actuated in the first direction. Moreover, the charge cord is drawn outwardly from the retracting unit when the retraction unit is actuated in the second direction. A wall charge adapter is pluggable into a female electrical outlet and the charge cord is pluggable into the wall charge adapter for charging the electronic device. A cigarette lighter adapter is pluggable into a cigarette lighter port in a vehicle for charging the electronic device with the cigarette lighter port in the vehicle.

8 Claims, 4 Drawing Sheets

US 10,931,073 B1

RETRACTABLE CHARGING ADAPTER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to adapter devices and more particularly pertains to a new adapter device for storing and organizing a charge cord for an electronic device.

(2) Description of Related Art Including Information Disclosed Under 37 CFR 1.97 and 1.98

The prior art relates to adapter devices.

BRIEF SUMMARY OF THE INVENTION

An embodiment of the disclosure meets the needs presented above by generally comprising a retraction unit that is actuatable in a first direction or a second direction. A charge cord is coupled to the retraction unit and the charge cord is drawn into the retraction unit when the retraction unit is actuated in the first direction. Moreover, the charge cord is drawn outwardly from the retracting unit when the retraction unit is actuated in the second direction. A wall charge adapter is pluggable into a female electrical outlet and the charge cord is pluggable into the wall charge adapter for charging the electronic device. A cigarette lighter adapter is pluggable into a cigarette lighter port in a vehicle for charging the electronic device with the cigarette lighter port in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
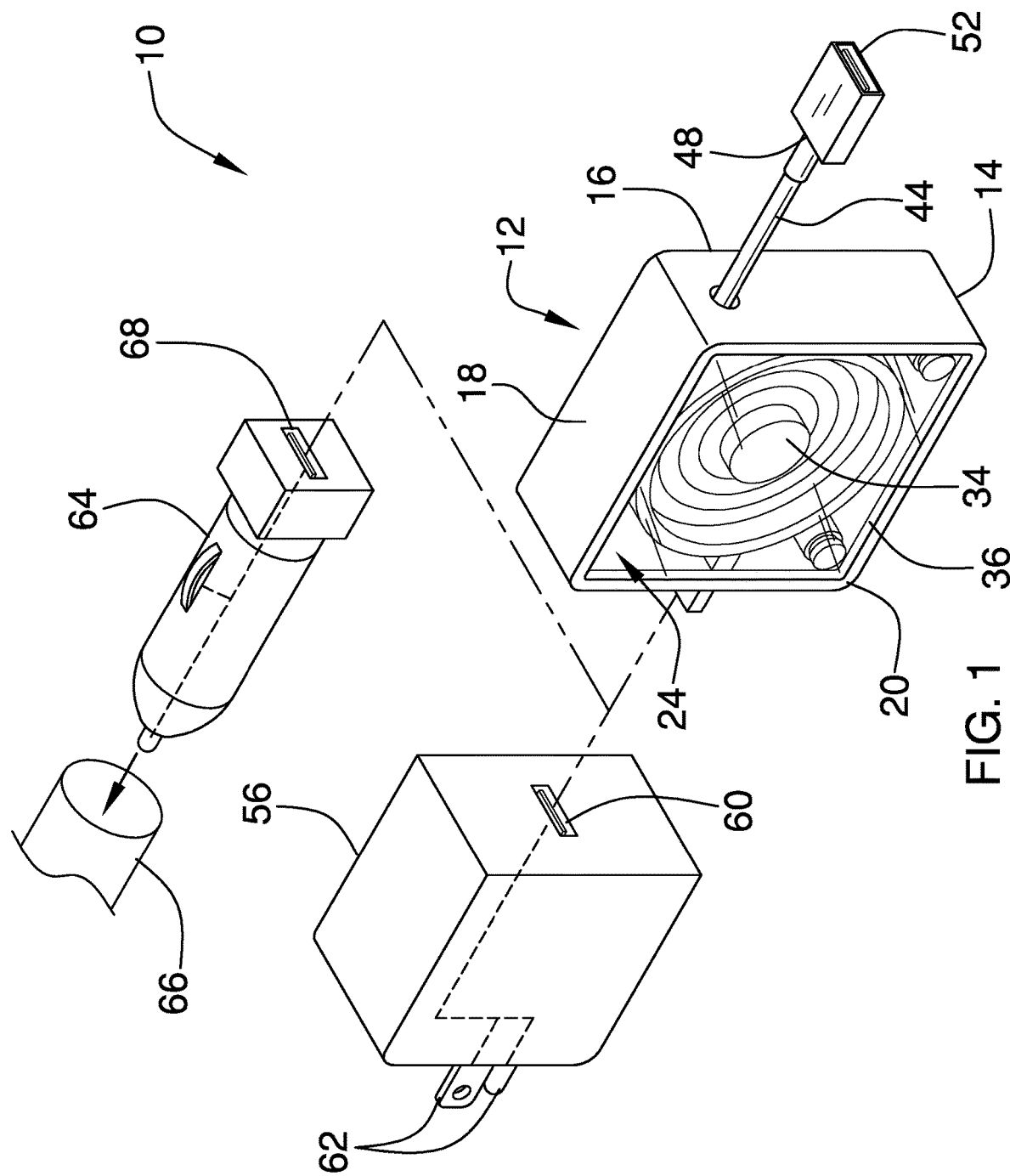
FIG. 1 is a perspective view of a retractable charging adapter assembly according to an embodiment of the disclosure.
Figure 2:
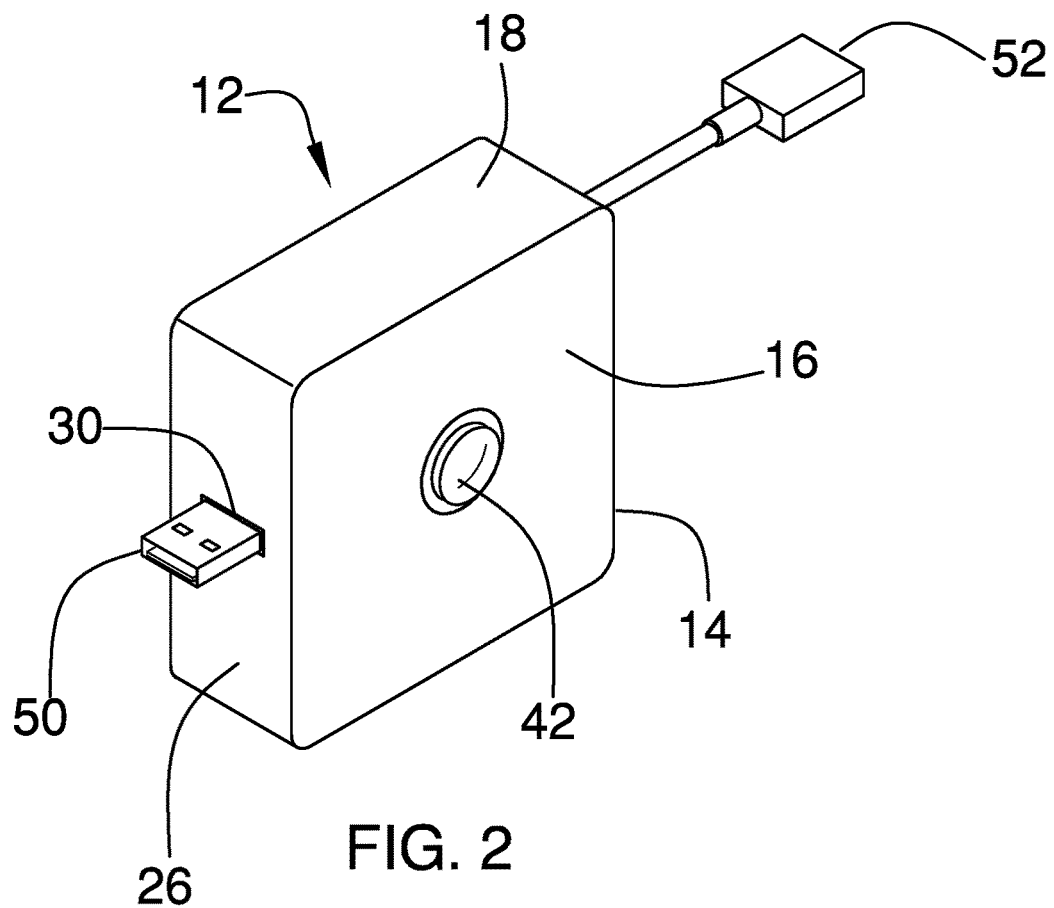
FIG. 2 is a back perspective view of a retraction unit of an embodiment of the disclosure.
Figure 3:
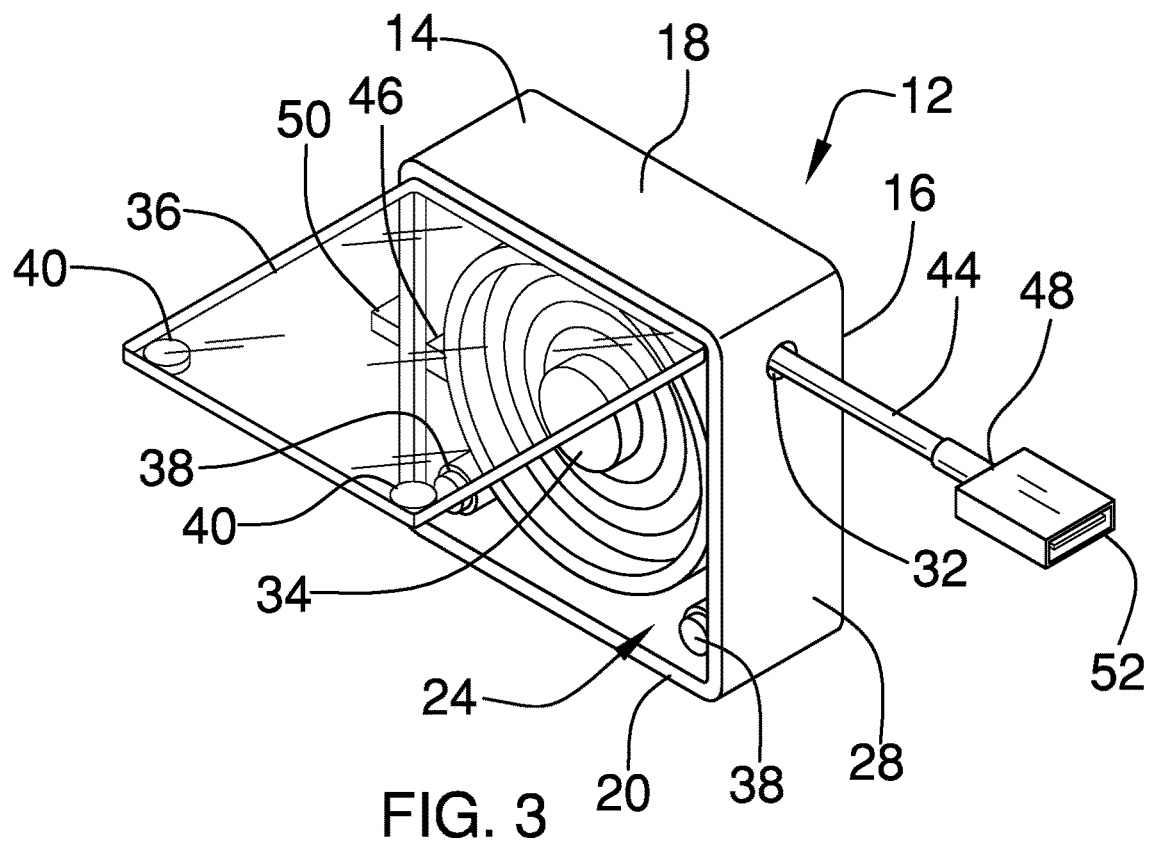
FIG. 3 is a front perspective view of a retraction unit of an embodiment of the disclosure.
Figure 4:
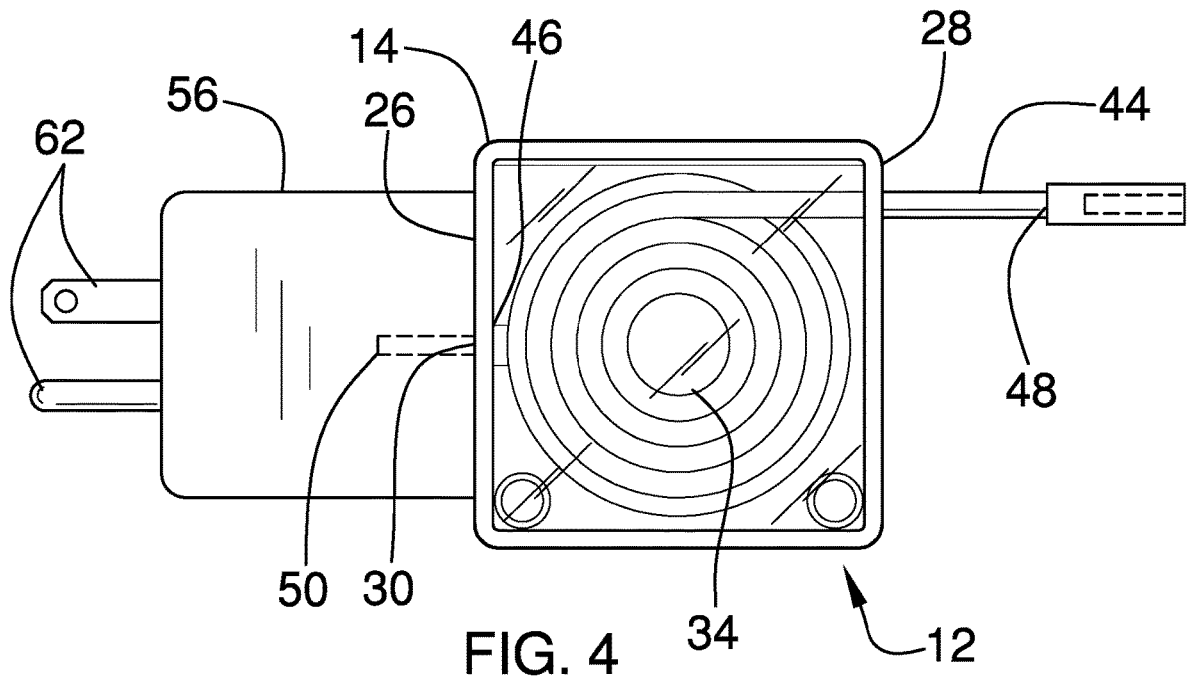
FIG. 4 is a front view of a retraction unit and a wall charge adapter of an embodiment of the disclosure.
Figure 5:
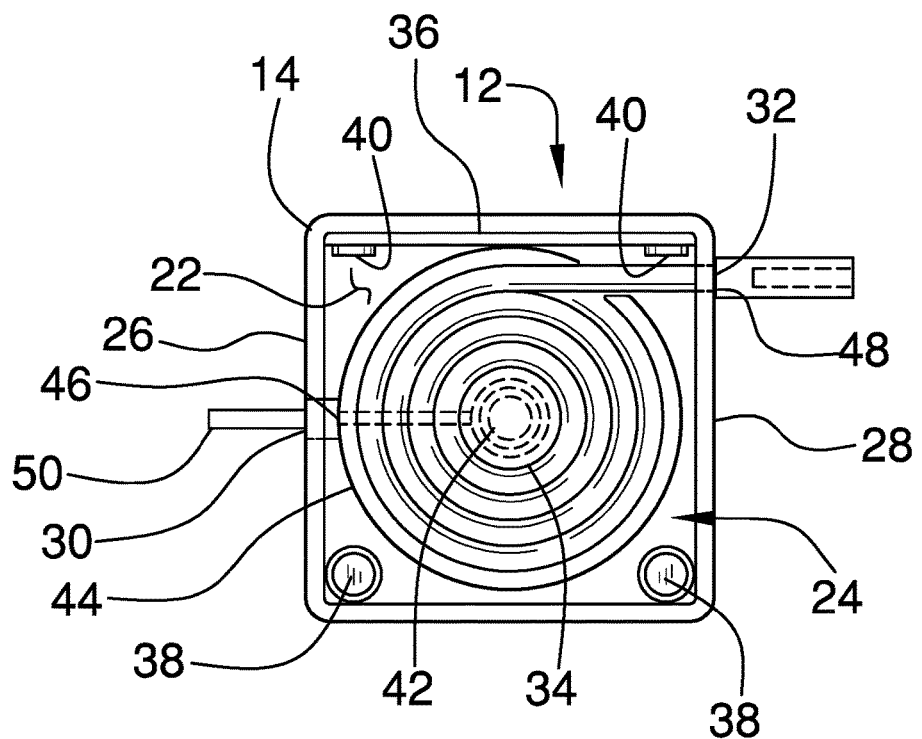
FIG. 5 is a front view of retraction unit and a charge cord of an embodiment of the disclosure.
Figure 6:
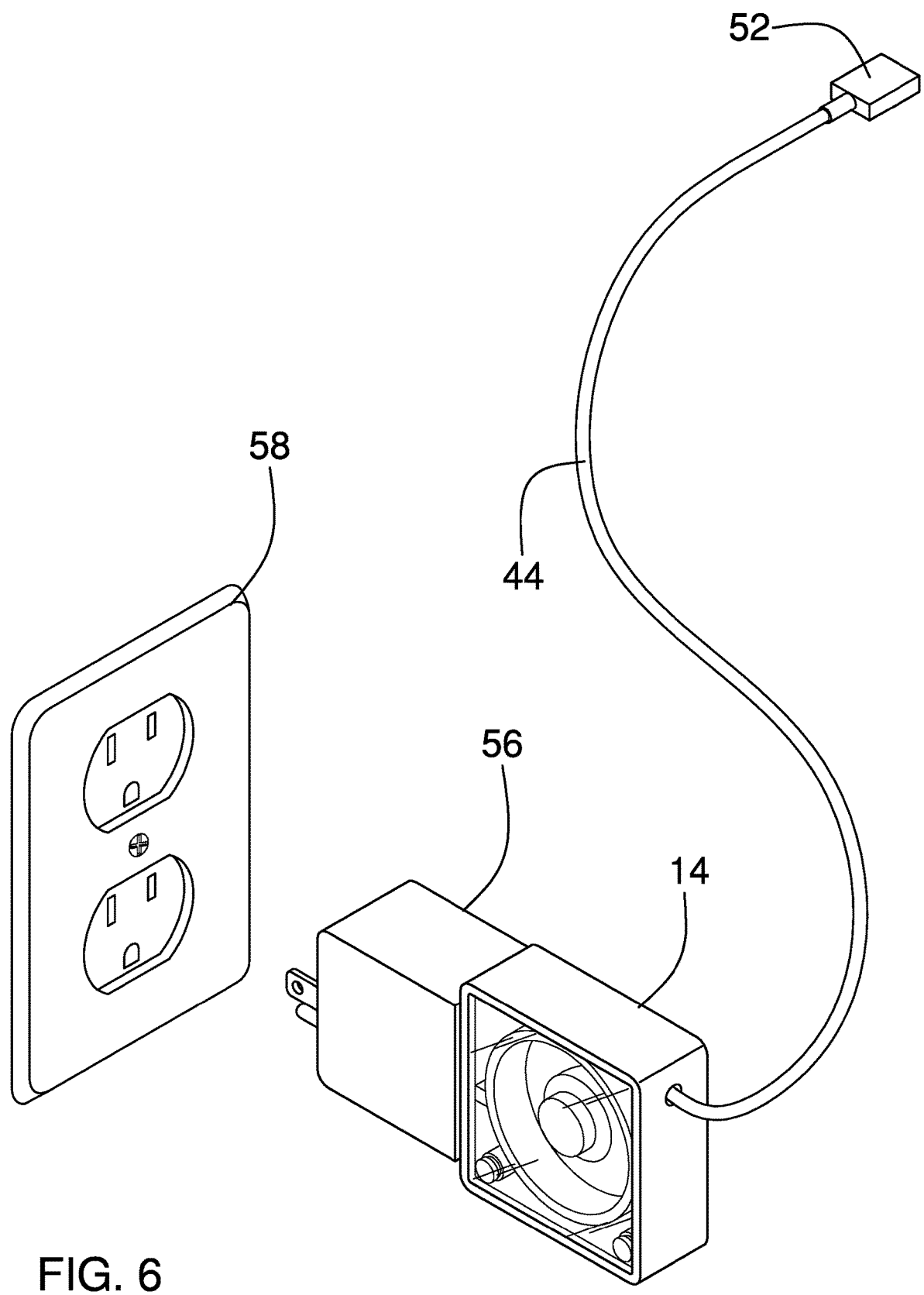
FIG. 6 is a perspective in-use view of an embodiment of the disclosure.

With reference now to the drawings, and in particular to FIGS. 1 through 6 thereof, a new adapter device embodying the principles and concepts of an embodiment of the disclosure and generally designated by the reference numeral 10 will be described.

As best illustrated in FIGS. 1 through 6, the retractable charging adapter assembly 10 generally comprises a retraction unit 12 that is actuatable in a first direction or a second direction. The retraction unit 12 comprises a housing 14 that has a first wall 16 and a perimeter wall 18 extending away therefrom. The perimeter wall 18 has a distal edge 20 with respect to a first surface 22 of the first wall 16 and the distal edge 20 defines an opening 24 into the housing 14. The perimeter wall 18 has a first lateral side 26 and a second lateral side 28. The first lateral side 26 has a first cord opening 30 extending into an interior of the housing 14 and the second lateral side 28 has a second cord opening 32 extending into the interior of the housing 14.

A spool 34 is rotatably coupled to the first surface 22 of the first wall 16. The spool 34 is biased to rotate in a first direction and the spool 34 is urgeable to rotate in a second direction. The spool 34 may be a spring loaded spool or other similar mechanical device. A door 36 is hingedly coupled to the perimeter wall 18 of the housing 14. The door 36 covers the opening 24 defined by the distal edge 20 of the perimeter wall 18 when the door 36 is closed. Additionally, the door 36 exposes the opening 24 when the door 36 is opened and the door 36 has a primary surface.

A plurality of first magnets 38 is each of the first magnets 38 is coupled to and extends away from the first surface 22 of the first wall 16 of the housing 14 such that each of the first magnets 38 is positioned in the housing 14. A pair of second magnets 40 is each coupled to the primary surface of the door 36 and each of the second magnets 40 is aligned with a respective one of the first magnets 38. Moreover, each of the second magnets 40 engages the respective first magnet when the door 36 is closed for retaining the door 36 in a closed position.

The retraction unit 12 includes a locking mechanism 42 that is positioned in the housing 14. The locking mechanism 42 extends through the first wall 16 of the housing 14 and the locking mechanism 42 is in mechanical communication with the spool 34. The locking mechanism 42 is biased into a first condition having the locking mechanism 42 inhibiting the spool 34 from rotating in the first direction. Additionally, the locking mechanism 42 is urgeable into a second condition having the locking mechanism 42 facilitating the spool 34 to rotate in the first direction when the locking mechanism 42 is depressed.

A charge cord 44 is provided and the charge cord 44 is coupled to the retraction unit 12. The charge cord 44 is drawn into the retraction unit 12 when the retraction unit 12 is actuated in the first direction. The charge cord 44 is drawn outwardly from the retraction unit 12 when the retraction unit 12 is actuated in the second direction. The charge cord 44 has a first end 46 and a second end 48, and the charge cord 44 is wrapped around the spool 34. The first end 46 is directed outwardly from the first cord opening 30 in the first lateral side 26 of the perimeter wall 18 of the housing 14. The second end 48 is directed outwardly from the second cord opening 32 in the second lateral side 28 of the perimeter wall 18 of the housing 14. The spool 34 is rotated in the second direction when the charge cord 44 is drawn outwardly from the housing 14. Conversely, the spool 34 rotates in the first direction when the charge cord 44 is untethered for retracting the charge cord 44 into the housing 14.

A first plug 50 is electrically coupled to the charge cord 44 and the first plug 50 is positioned on the first end 46 of the charge cord 44. The first plug 50 abuts the first lateral side 26 of the perimeter wall 18 of the housing 14 when the spool 34 rotates in the first direction to inhibit the first end 46 of the charge cord 44 from being drawn into the housing 14. Additionally, the first plug 50 may comprise a usb plug, a micro usb plug or any other type of electrical plug found on charging cords.

A second plug 52 is electrically coupled to the charge cord 44 and the second plug 52 is positioned on the second end 48 of the charge cord 44. The second plug 52 abuts the second lateral side 28 of the perimeter wall 18 of the housing 14 when the spool 34 rotates in the first direction to inhibit the second end 48 of the charge cord 44 from being drawn into the housing 14. The second plug 52 is electrically pluggable into an electronic device 54. The second plug 52 may comprise a usb plug, a mirco usb plug or any other type of electrical plug found on charging cords. Additionally, the electronic device 54 may be smart phone, a laptop computer, an I-pad or any other type of rechargeable, personal electronic device.

A wall charge adapter 56 is provided that is pluggable into a female electrical outlet 58 in a wall, extension cord or other source of AC voltage. The wall charge adapter 56 has a charge port 60 therein and the charge cord 44 is pluggable into the charge port 60 for receiving electrical current from the female electrical outlet 58. In this way the charge cord 44 can charge the electronic device 54 with the female electrical outlet 58. The wall charge adapter 56 includes a plurality of wall contacts 62 each extending away from the wall charge adapter 56. Each of the wall contacts 62 is plugged into the female electrical outlet 58 and the charge port 60 is in electrical communication with each of the wall contacts 62. The first plug 50 on the charge cord 44 is pluggable into the charge port 60. The charge port 60 may be a usb port, a micro usb port or other type of port that is compatible with the first plug 50. Additionally, the wall charge adapter 56 includes electronic circuitry common to usb chargers or the like.

A cigarette lighter adapter 64 is pluggable into a cigarette lighter port 66 in a vehicle and the cigarette lighter adapter 64 has a charge port 68 therein. A charge cord 44 is pluggable into the charge port 68 in the cigarette lighter adapter 64 for receiving electrical current from the cigarette lighter port 66 in the vehicle. In this way the charge cord 44 can charge the electronic device 54 with the cigarette lighter port 66 in the vehicle. The first plug 50 on the charge cord 44 is pluggable into the charge port 68 on the cigarette lighter adapter 64.

In use, the wall charge adapter 56 is plugged into the female electrical outlet 58 for charging with AC voltage. The charge cord 44 is drawn outwardly from the housing 14 and the first plug 50 is plugged into the charge port 60 on the wall charge adapter 56. Thus, the second plug 52 can be plugged into the electronic device 54 for charging the electronic device 54 in a house or the like. The cigarette lighter adapter 64 is plugged into the cigarette lighter port 66 in the vehicle for charging with DC voltage. The first plug 50 is plugged into the charge port 68 on the cigarette lighter adapter 64 for charging the electronic device 54 in a vehicle or the like. The locking mechanism 42 is depressed to retract the charge cord 44 into the housing 14 when the charge cord 44 is not being used. In this way the charge cord 44 can be stored and organized when the charge cord 44 is not in use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A retractable charging adapter assembly being configured to facilitate an electronic device to be charged from a variety of power sources, said assembly comprising:
   a retraction unit being actuatable in a first direction or a second direction, said retraction unit comprising
      a housing having a first wall and a perimeter wall extending away therefrom, said perimeter wall having a distal edge with respect to a first surface of said first wall, said distal edge defining an opening into said housing, said perimeter wall having a first lateral side and a second lateral side, said first lateral side having a first cord opening extending into an interior of said housing, said second lateral side having a second cord opening extending into said interior of said housing,
a spool being rotatably coupled to said first surface of said first wall, said spool being biased to rotate in a first direction, said spool being urgeable to rotate in a second direction,
a door being hingedly coupled to said perimeter wall of said housing, said door covering said opening defined by said distal edge of said perimeter wall when said door is closed, said door exposing said opening when said door is opened, said door having a primary surface, and
a locking mechanism being positioned in said housing, said locking mechanism extending through said first wall of said housing, said locking mechanism being in mechanical communication with said spool, said locking mechanism being biased into a first condition having said locking mechanism inhibiting said spool from rotating in said first direction, said locking mechanism being urgeable into a second condition having said locking mechanism facilitating said spool to rotate in said first direction when said locking mechanism is depressed;
a charge cord being coupled to said retraction unit, said charge cord being drawn into said retraction unit when said retraction unit is actuated in said first direction, said charge cord being drawn outwardly from said retracting unit when said retraction unit is actuated in said second direction;
a wall charge adapter being pluggable into a female electrical outlet, said wall charge adapter having a charge port therein, said charge cord being pluggable into said charge port for receiving electrical current from the female electrical outlet wherein said charge cord is configured to charge the electronic device with the female electrical outlet; and
a cigarette lighter adapter being pluggable into a cigarette lighter port in a vehicle, said cigarette light adapter having a charge port therein, charge cord being pluggable into said charge port in said cigarette lighter adapter for receiving electrical current from the cigarette lighter port in the vehicle wherein said charge cord is configured to charge the electronic device with the cigarette lighter port in the vehicle.

2. The assembly according to claim 1, further comprising a plurality of first magnets, each of said first magnets being coupled to said first surface of said first wall of said housing such that each of said first magnets is positioned in said housing.

3. The assembly according to claim 2, further comprising a pair of second magnets, each of said second magnets being coupled to said primary surface of said door, each of said second magnets being aligned with a respective one of said first magnets, each of said second magnets engaging said respective first magnet when said door is closed for retaining said door in a closed position.

4. The assembly according to claim 1, wherein said charge cord has a first end and a second end, said charge cord being wrapped around said spool, said first end being directed outwardly from said first cord opening in said first lateral side of said perimeter wall of said housing, said second end being directed outwardly from said second cord opening in said second lateral side of said perimeter wall of said housing, said spool being rotated in said second direction when said charge cord is drawn outwardly from said housing, said spool rotating in said first direction when said charge cord is untethered for retracting said charge cord into said housing.

5. The assembly according to claim 4, further comprising a first plug being electrically coupled to said charge cord, said first plug being positioned on said first end of said charge cord, said first plug abutting said first lateral side of said perimeter wall of said housing when said spool rotates in said first direction to inhibit said first end of said charge cord from being drawn into said housing.

6. The assembly according to claim 5, further comprising a second plug being electrically coupled to said charge cord, said second plug being positioned on said second end of said charge cord, said second plug abutting said second lateral side of said perimeter wall of said housing when said spool rotates in said first direction to inhibit said second end of said charge cord from being drawn into said housing, said second plug being electrically pluggable into an electronic device.

7. The assembly according to claim 6, wherein said wall charge adapter includes a plurality of wall contacts each extending away from said wall charge adapter, each of said wall contacts being plugged into the female electrical outlet, said charge port being in electrical communication with each of said wall contacts, said first plug being pluggable into said charge port.

8. A retractable charging adapter assembly being configured to facilitate an electronic device to be charged from a variety of power sources, said assembly comprising:
a retraction unit being actuatable in a first direction or a second direction, said retraction unit comprising:
a housing having a first wall and a perimeter wall extending away therefrom, said perimeter wall having a distal edge with respect to a first surface of said first wall, said distal edge defining an opening into said housing, said perimeter wall having a first lateral side and a second lateral side, said first lateral side having a first cord opening extending into an interior of said housing, said second lateral side having a second cord opening extending into said interior of said housing;
a spool being rotatably coupled to said first surface of said first wall, said spool being biased to rotate in a first direction, said spool being urgeable to rotate in a second direction;
a door being hingedly coupled to said perimeter wall of said housing, said door covering said opening defined by said distal edge of said perimeter wall when said door is closed, said door exposing said opening when said door is opened, said door having a primary surface;
a plurality of first magnets, each of said first magnets being coupled to said first surface of said first wall of said housing such that each of said first magnets is positioned in said housing;
a pair of second magnets, each of said second magnets being coupled to said primary surface of said door, each of said second magnets being aligned with a respective one of said first magnets, each of said second magnets engaging said respective first magnet when said door is closed for retaining said door in a closed position; and
a locking mechanism being positioned in said housing, said locking mechanism extending through said first wall of said housing, said locking mechanism being in mechanical communication with said spool, said locking mechanism being biased into a first condition having said locking mechanism inhibiting said spool from rotating in said first direction, said locking mechanism being urgeable into a second condition having said locking mechanism facilitating said spool to rotate in said first direction when said locking mechanism is depressed;

a charge cord being coupled to said retraction unit, said charge cord being drawn into said retraction unit when said retraction unit is actuated in said first direction, said charge cord being drawn outwardly from said retracting unit when said retraction unit is actuated in said second direction, said charge cord having a first end and a second end, said charge cord being wrapped around said spool, said first end being directed outwardly from said first cord opening in said first lateral side of said perimeter wall of said housing, said second end being directed outwardly from said second cord opening in said second lateral side of said perimeter wall of said housing, said spool being rotated in said second direction when said charge cord is drawn outwardly from said housing, said spool rotating in said first direction when said charge cord is untethered for retracting said charge cord into said housing;

a first plug being electrically coupled to said charge cord, said first plug being positioned on said first end of said charge cord, said first plug abutting said first lateral side of said perimeter wall of said housing when said spool rotates in said first direction to inhibit said first end of said charge cord from being drawn into said housing;

a second plug being electrically coupled to said charge cord, said second plug being positioned on said second end of said charge cord, said second plug abutting said second lateral side of said perimeter wall of said housing when said spool rotates in said first direction to inhibit said second end of said charge cord from being drawn into said housing, said second plug being electrically pluggable into an electronic device;

a wall charge adapter being pluggable into a female electrical outlet, said wall charge adapter having a charge port therein, said charge cord being pluggable into said charge port for receiving electrical current from the female electrical outlet wherein said charge cord is configured to charge the electronic device with the female electrical outlet, said wall charge adapter including a plurality of wall contacts each extending away from said wall charge adapter, each of said wall contacts being plugged into the female electrical outlet, said charge port being in electrical communication with each of said wall contacts, said first plug on said charge cord being pluggable into said charge port; and a cigarette lighter adapter being pluggable into a cigarette lighter port in a vehicle, said cigarette light adapter having a charge port therein, charge cord being pluggable into said charge port in said cigarette lighter adapter for receiving electrical current from the cigarette lighter port in the vehicle wherein said charge cord is configured to charge the electronic device with the cigarette lighter port in the vehicle, said first plug on said charge cord being pluggable into said charge port on said cigarette lighter adapter.

* * * * *